US 7,853,062 B2

(12) United States Patent
Kiraly et al.

(10) Patent No.: US 7,853,062 B2
(45) Date of Patent: Dec. 14, 2010

(54) SYSTEM AND METHOD FOR POLYP DETECTION IN TAGGED OR NON-TAGGED STOOL IMAGES

(75) Inventors: Atilla Peter Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 935 days.

(21) Appl. No.: 11/468,964

(22) Filed: Aug. 31, 2006

(65) Prior Publication Data

US 2007/0071298 A1 Mar. 29, 2007

Related U.S. Application Data

(60) Provisional application No. 60/716,669, filed on Sep. 13, 2005.

(51) Int. Cl.
*G06K 9/00* (2006.01)
(52) U.S. Cl. .................. 382/131; 600/425; 382/128
(58) Field of Classification Search ........... 600/407, 600/410, 414, 420, 425, 426, 437; 382/128, 382/131; 3/407, 410, 414, 420, 425, 426, 3/437
See application file for complete search history.

(56) References Cited

U.S. PATENT DOCUMENTS

| 7,529,395 B2 * | 5/2009 | Cathier et al. | ............... 382/128 |
| 2005/0020912 A1 | 1/2005 | Kiraly et al. | |
| 2005/0036691 A1 * | 2/2005 | Cathier | ........................ 382/203 |
| 2005/0152591 A1 | 7/2005 | Kiraly | |
| 2005/0256399 A1 * | 11/2005 | Sirohey et al. | ............... 600/425 |
| 2006/0120591 A1 * | 6/2006 | Cathier et al. | ................ 382/154 |

FOREIGN PATENT DOCUMENTS

WO WO 01/78017 A2 10/2001

OTHER PUBLICATIONS

Acar B., Napel S., Paik D., Gokturk S.B., Tomasi C., Beaulieu C.F., "Using Optical Flow Fields For Polyp Detection in Virtual Colonoscopy", *MICCAI 2001*, Utrecht, The Netherlands, Oct. 14-17, 2001, W.J. Niessen and M.A. Viergever editors, LNCS 2208, Springer-Verlag, pp. 637-644.

S B Gokturk, C Tomasi, B Acar, C F Beaulieu, D S Paik, R B Jeffrey Jr., J Yee, and S Napel, "A Statistical 3-D Pattern Processing Method for Computer-Aided Detection of Polyps in CT Colonography", IEEETMI, Dec. 2001.

(Continued)

*Primary Examiner*—Brian Casler
*Assistant Examiner*—Amanda Lauritzen

(57) ABSTRACT

A method for detecting polyp candidates in tagged stool or non-tagged stool images without performing stool subtraction, includes: applying a filter to locations in image data of a colon including tagged or non-tagged stool to generate a response image based on a gradient magnitude, angle, and radius in relation to another location in the image data for each of the locations, wherein the locations are indicated in the response image as tagged or non-tagged stool based on their density or brightness within the response image; and selecting locations in the response image above a threshold as polyp candidates.

20 Claims, 2 Drawing Sheets

OTHER PUBLICATIONS

A K Jerebko, J D Malley, M Franaszek, and R M Summers, "Computer aided polyp detection in CT colonography using an ensemble of support vector machines," 5th International Workshop on Computer-Aided Diagnosis, Jun. 2003.

Summers RM, Johnson CD, Pusanik LM, et al. "Automated Polyp Detection at CT Colonography: Feasibility Assessment in a Human Population", Radiology 2001, 219:51-59.

Nappi J, Yoshida H. "Feature-guided analysis for reduction of false positives in CAD of polyps for CT colonography,"Medical Physics 2003.

Yoshida H, Nappi J. "Three-dimensional Computer-Aided Diagnosis Scheme for Detection of Colonic Polyps," IEEE Transactions on Medial Imaging 2001; 20:1261-1274.

Paik DS, Beaulieu CF, Mani A, et al. "Evaluation of Computer-aided Detection in CT Colonography: Potential Applicability to a Screening Population," Radiology 2001; 221(P): 332.

Kiraly AP, Laks S, Macari M, Geiger B, Bogoni L, Novak CL, "A fast method for colon polyp detection in high-resolution CT data", CARS 2004: 983-988.

Zalis M, Yoshida H, Nappi J, Magee C, and Hahn P, "Evaluation of False Positive Detections in Combined Computer Aided Polyp Detection and Minimal Preparation/Digital Subtraction CT Colonography (CTC)", RSNA 2004.

Macari M, Mikheev A, Neil J, Lee J, and Rusinek H, "Fully Automated Segmentation of Tagged Fecal Material: Validation of CT Colonography of the Unprepped Colon", RSNA 2004.

Yoshida H , Lefere P, Nappi J, Gryspeerdt S, Okamura A and Dachman A, "Computer-aided Detection of Polyps in CT Colonography with Dietary Fecal Tagging: Pilot Assessment of Performance", RSNA 2004.

Jerebko, Anna K. el al., "Computer-assisted detection of colonic polyps with CT colonography using neural networks and binary classification trees," Medical Physics, AIP, 30:1 (2003) pp. 52-60.

International Search Report.

\* cited by examiner

SYSTEM AND METHOD FOR POLYP DETECTION IN TAGGED OR NON-TAGGED STOOL IMAGES

CROSS-REFERENCE TO RELATED APPLICATION

This application claims the benefit of U.S. Provisional Application No. 60/716,669, filed Sep. 13, 2005, a copy of which is herein incorporated by reference.

BACKGROUND OF THE INVENTION

1. Technical Field

The present invention relates to colonography, and more particularly, to a system and method for polyp detection in tagged or non-tagged stool images.

2. Discussion of the Related Art

Early detection of colon cancer through polyp screening via computed tomography colonography (CTC) is gaining increasing acceptance. CTC involves two high-resolution CT scans taken at prone and supine positions. However, current prone and supine acquisition datasets can be time consuming for physicians such as radiologists to analyze. Recently, computer aided detection (CAD) methods have been introduced to help radiologists find polyps in such datasets. These methods have also been shown to work with other scanning modalities such as magnetic resonance imaging (MRI).

Although CAD methods promise to help reduce polyps that are missed by radiologists, patient discomfort remains high since they must still undergo the standard colonography preparation regimen. To make the examination process more comfortable, radio-opaque liquids can be given to the patient a few days before the scan, instead of a more restrictive liquid-only diet followed by laxatives to clean out the colon. By using radio-opaque liquids, patient discomfort is reduced at the cost of more residual stool within the colon. However, this stool is tagged by the liquids and is clearly distinguishable from other elements within the body.

Frequently, despite a cleansing regimen, residual stool will remain in the colon and can lead to false positives for both radiologists and CAD methods. Tagged stool, on the other hand, appears very bright within the images and can be easily identified. However, even with tagged stool, it can still be difficult for radiologists and CAD methods to detect polyps. For example, the bright stool can be distractive and create artifacts in the images. Further, standard CAD methods are not designed to handle tagged stool images, thereby leading to errors such as false positives when a polyp is covered or partially covered by tagged stool.

Current research focuses on using tagged stool subtraction techniques to correct these errors. Examples of such research are presented in Zalis M, Yoshida H, Nappi J, Magee C, and Hahn P, "Evaluation of False Positive Detections in Combined Computer Aided Polyp Detection and Minimal Preparation/Digital Subtraction CT Colonography (CTC)", RSNA 2004, and Macari M, Mikheev A, Neil J, Lee J, and Rusinek H, "Fully Automated Segmentation of Tagged Fecal Material: Validation of CT Colonography of the Unprepped Colon", RSNA 2004.

These approaches attempt to subtract stool from an image of a colon while retaining the smooth borders of the colon wall and preserving any underlying polyps. However, these approaches are not yet fully developed and may still create artifacts. artificial borders and rough edges, which in turn can cause errors for radiologists and existing CAD methods. Although existing CAD methods have been applied directly to tagged stool datasets as described, e.g., in H Yoshida, P Lefere, J Nappi, S Gryspeerdt, A Okamura, and A Dachman, "Computer-aided Detection of Polyps in CT Colonography with Dietary Fecal Tagging: Pilot Assessment of Performance", RSNA 2004, the majority, if not all, of the polyps detected were not covered by or even near tagged stool.

SUMMARY OF THE INVENTION

In an exemplary embodiment of the present invention, a method for detecting polyp candidates in tagged stool or non-tagged stool images without performing stool subtraction, comprises: applying a filter to locations in image data of a colon including tagged or non-tagged stool to generate a response image based on a gradient magnitude, angle, and radius in relation to another location in the image data for each of the locations, wherein the locations are indicated in the response image as tagged or non-tagged stool based on their density or brightness within the response image; and selecting locations in the response image above a threshold as polyp candidates.

The method further comprises localizing the colon before applying the filter. The method further comprises collecting features of the polyp candidates. The method further comprises segmenting the polyp candidates before collecting features of the polyp candidates. Collecting features of the polyp candidates comprises: collecting features of polyp candidates not covered with the tagged or non-tagged stool; and collecting features of polyp candidates covered or partially covered with the tagged or non-tagged stool.

The method further comprises classifying the polyp candidates according to the collected features. Classifying the polyp candidates comprises: classifying the polyp candidates near the tagged stool; and classifying the polyp candidates not near the tagged stool. The method further comprises marking the polyp candidates in the response image with identifiers indicating a further processing to be performed thereon.

In an exemplary embodiment of the present invention, a computer program product comprises a computer useable medium having computer program logic recorded thereon for detecting polyp candidates in tagged stool or non-tagged stool images without performing stool subtraction, the computer program logic comprises: program code for applying a filter to locations in image data of a colon including tagged or non-tagged stool to generate a response image based on a gradient magnitude, angle, and radius in relation to another location in the image data for each of the locations, wherein the locations are indicated in the response image as tagged or non-tagged stool based on their density or brightness within the response image; and program code for selecting locations in the response image above a threshold as polyp candidates.

The computer program product further comprises program code for localizing the colon before applying the filter. The computer program product further comprises program code for collecting features of the polyp candidates. The computer program product further comprises program code for segmenting the polyp candidates before collecting features of the polyp candidates. The program code for collecting features of the polyp candidates comprises: program code for collecting features of polyp candidates not covered with the tagged or non-tagged stool; and program code for collecting features of polyp candidates covered or partially covered with the tagged or non-tagged stool.

The computer program product further comprises program code for classifying the polyp candidates according to the collected features. The program code for classifying the polyp candidates comprises: program code for classifying the polyp candidates near the tagged stool; and program code for classifying the polyp candidates not near the tagged stool. The computer program product further comprises program code for marking the polyp candidates in the response image with identifiers indicating a further processing to be performed thereon.

In an exemplary embodiment of the present invention, a computer aided detection (CAD) method for detecting polyps in image data of a patient's colon, comprises: administering a stool marker to a patient to tag stool in the patient's colon; acquiring image data of the patient's colon including the tagged stool; localizing the patient's colon in the image data; generating polyp candidates without subtracting the tagged stool from the segmented colon by applying a filter to three-dimensional (3D) locations in the segmented colon to generate a response image based on a local gradient magnitude, angle and radius in relation to another 3D location in the segmented colon for each of the 3D locations; identifying locations in the response image scored above a threshold by the filter as the polyp candidates; segmenting the polyp candidates; collecting features of the polyp candidates; and classifying the polyp candidates according to the collected features.

Collecting features of the polyp candidates comprises: collecting features of polyp candidates not covered with the tagged stool; and collecting features of polyp candidates covered or partially covered with the tagged stool. Classifying the polyp candidates according to the collected features comprises: classifying the polyp candidates near the tagged stool; and classifying the polyp candidates not near the tagged stool.

The image data is acquired by computed tomography, magnetic resonance or ultrasound. The CAD method further comprises marking the polyp candidates in the response image with identifiers indicating a further processing to be performed thereon.

In an exemplary embodiment of the present invention, a system for detecting polyp candidates in tagged stool or non-tagged stool images, comprises: a candidate generator for generating polyp candidates by applying a filter to locations in image data of a colon including tagged or non-tagged stool to generate a response image based on a gradient magnitude, angle, and radius in relation to another location in the image data for each of the locations, wherein the locations are indicated in the response image as tagged or non-tagged stool based on their density or brightness within the response image; and selecting locations in the response image above a threshold as the polyp candidates; a feature generator for collecting features of the polyp candidates; and a classifier for classifying the polyp candidates according to the collected features.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining; equivalents. Additional features of the invention will become apparent in the following description, from the drawings and from the claims.

DETAILED DESCRIPTION OF EXEMPLARY EMBODIMENTS

Figure 1:
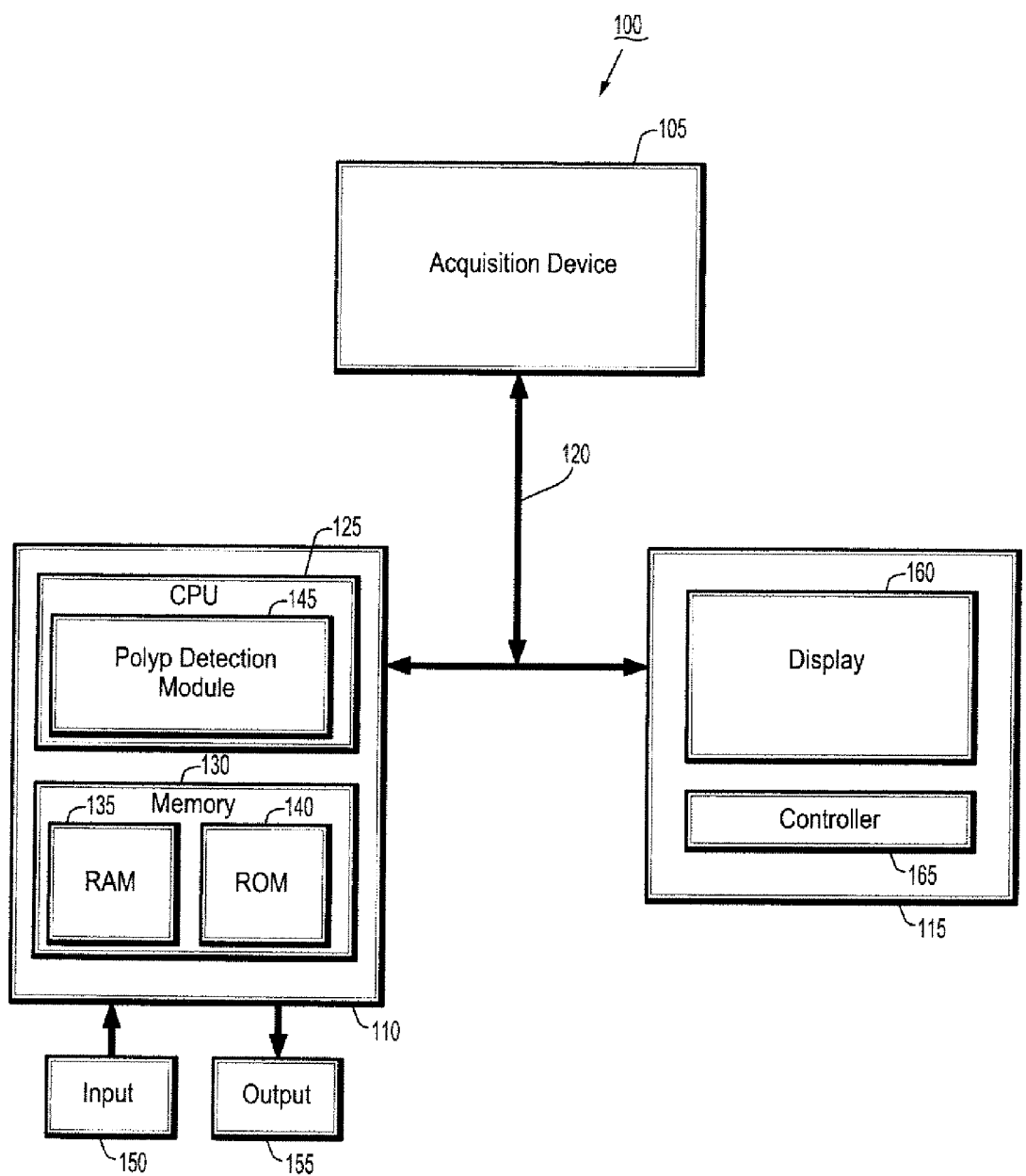
FIG. 1 is a block diagram of a system for polyp detection in tagged or non-tagged stool images according to an exemplary embodiment of the present invention.

FIG. 1 is a block diagram illustrating a system 100 for polyp detection in tagged or non-tagged stool images according to an exemplary embodiment of the present invention. As shown in FIG. 1, the system 100 includes an acquisition device 105, a PC 110 and an operator's console 115 connected over a wired or wireless network 120.

The acquisition device 105 may be a multi-slice computed tomography (MSCT) imaging device or any other three-dimensional (3D) high resolution imaging device such as a magnetic resonance (MR) scanner or an ultrasound scanner.

The PC 110, which may be a portable or laptop computer, a medical diagnostic imaging system or a picture archiving communications system (PACS) data management station, includes a CPU 125 and a memory 130 connected to an input device 150 and an output device 155. The CPU 125 includes a polyp detection module 145 that includes one or more methods for polyp detection in tagged or non-tagged stool images to be discussed hereinafter with reference to FIG. 2. Although shown inside the CPU 125, the polyp detection module 145 can be located outside the CPU 125.

The memory 130 includes a RAM 135 and a ROM 140. The memory 130 can also include a database, disk drive, tape drive, etc., or a combination thereof. The RAM 135 functions as a data memory that stores data used during execution of a program in the CPU 125 and is used as a work area The ROM 140 functions as a program memory for storing a program executed in the CPU 125. The input 150 is constituted by a keyboard, mouse, etc., and the output 155 is constituted by an LCD, CRT display, printer, etc.

The operation of the system 100 can be controlled from the operator's console 115, which includes a controller 165, e.g., a keyboard, and a display 160. The operator's console 115 communicates with the PC 110 and the acquisition device 105 so that image data collected by the acquisition device 105 can be rendered by the PC 110 and viewed on the display 160. The PC 110 can be configured to operate and display information provided by the acquisition device 105 absent the operator's console 115, by using, e.g., the input 150 and output 155 devices to execute certain tasks performed by the controller 165 and display 160.

The operator's console 115 may further include any suitable image rendering system/tool/application that can process digital image data of an acquired image dataset (or portion thereof) to generate and display images on the display 160. More specifically, the image rendering system may be an application that provides rendering and visualization of medical image data, and which executes on a general purpose or specific computer workstation. The PC 110 can also include the above-mentioned image rendering systemltool/application.

Figure 2:
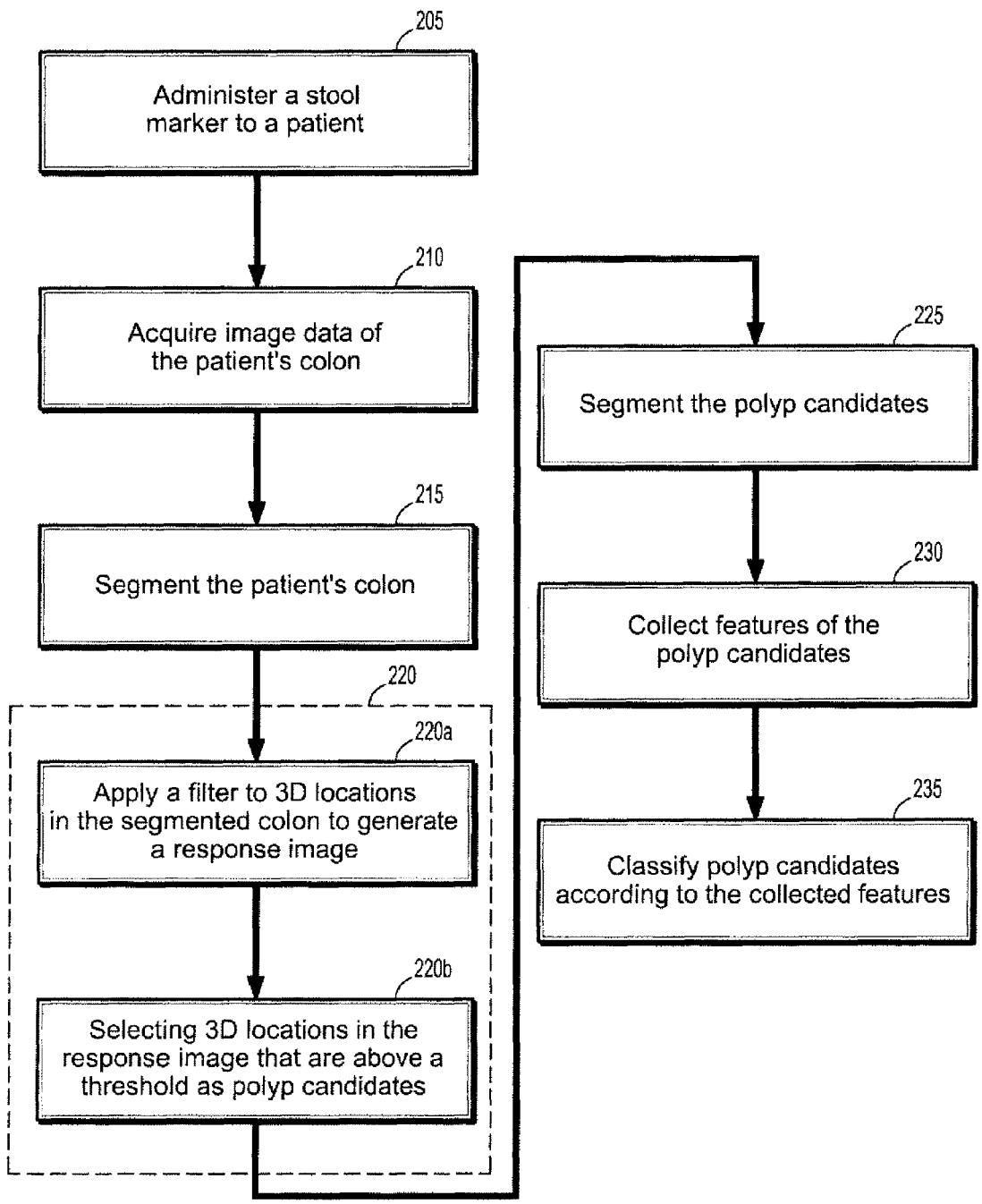
FIG. 2 is a flowchart illustrating a method for polyp detection in tagged or non-tagged stool images according to an exemplary embodiment of the present invention.

FIG. 2 is a flowchart illustrating a method for polyp detection in tagged or non-tagged stool images according to an exemplary embodiment of the present invention. As shown in FIG. 2, a stool marker is administered to a patient (205). The stool marker, e.g., is a compound or other substance that can be electronically identified in colonography images. In general, the stool maker is opaque to the wavelength of radiation or other parameter (e.g., ultrasound) used by the acquisition device 105 to generate the colonography images. An example of a stool marker is barium sulfate.

One or more days after the administration of the stool maker, image data of the patient's colon is acquired (210). This is done by using the acquisition device 105, in this example a CT scanner, which is operated at the operator's console 115, to scan the patient's abdomen thereby generating a series of 2D image slices associated with the abdomen. The 2D image slices are then combined to form a 3D image of the colon.

Once the image data is available, the colon is segmented (215). The colon can be segmented by using any suitable colon segmentation method including thresholding region-growing, component analysis, morphology and centerlines. It is not necessary to segment the colon for the modified filter to be described hereinafter with reference to step 220; however, by performing a rough segmentation or localization of the colon here, filter computation time and false positives can be reduced.

Following the colon segmentation or acquisition of the image data, candidate polyps are generated (220). Candidate polyps are generated by applying a filter to locations in the colon to generate a response image (220a). The filter according to an exemplary embodiment of the present invention is a modified multi-purpose Magnitude, Angle, Radius (MARS) filter. A conventional MARS filter followed by the modified MARS filter according to an exemplary embodiment of the present invention will now be described.

The conventional MARS filter is defined by the following equation:

$$M(x) = \frac{\int_{\forall y \in V'} S(m, \theta, r, y) \Delta y}{T(V')}.$$

In this equation, $M(x)$ is the output of the MARS filter at $x$, a 3D location within an image volume. $y$ is another 3D location in the volume. $m$ is the magnitude of a gradient at location $y$. $r$ is the radial distance from $y$ to $x$. $\theta$ is the angle between the gradient at the location $y$ and a ray from $x$ to $y$. The integral proceeds over a defined volume $V'$. The volume $V'$ can be the entire original image volume $V$ or a defined subset $V'$. The main function $S$ assigns individual values for each location $y$ about $x$, and these are summed within the integral. Thus, $S$ determines specific properties of the filter. The function $T$ provides a weighting based on the size of the given volume.

The following is a formulation for conventional polyp candidate generation in a non-tagged stool image:

$$S(m, \theta, r, y) = S_1(m) S_2(\theta, r) S_3(y),$$

where $$S_1(m) = \frac{(\tan^{-1}(m - C_1) + \frac{\pi}{2})}{\pi},$$

$$S_2(\theta, r) = \frac{1}{\sigma\sqrt{2\pi}} e^{\frac{-(r\sin(\theta))^2}{2\sigma^2}} \times \int_{-r\sin(90-\theta)}^{C_2 - r\sin(90-\theta)} \frac{1}{\sigma\sqrt{2\pi}} e^{\frac{-x^2}{2\sigma^2}} dx,$$

and $$S_3(y) = S_1(\min(V(x) \to V(y))).$$

In this formulation, $V(x)$ refers to the value in the image volume at the location $x$. $C_1$, $C_2$, and $\sigma$ are constants that depend on properties of, e.g., the acquisition device 105, and objects of interest that are dependent upon gray-level values of the image and the contrast. For example, $C_1$ can be derived from the Hounsfield values for air or soft tissue for CT data. The values for $C_2$ and $\sigma$ are size related and depend on the object of interest. The value of the function $T$ is constant and set to one. The function $S_1$ provides a scaling based on the magnitude of the given argument $m$. $S_2$ provides a score based on the distance and direction of the gradient at the point $y$ in relation to $x$. $S_3$ provides a scaling based on the gray-level values along the path from $x$ to $y$.

By modifying the conventional MARS filter with the following equation:

$$S(m, \theta, r, y) = S_1(m) \times S_3(y) \times (S_2(\theta, r, y) + S_5(\theta, r, y)),$$

polyp candidates from both tagged stool and clean sections of the colon can be generated. The individual functions are defined as:

$$S_1(m) = \frac{(\tan^{-1}(m - C_1) + \frac{\pi}{2})}{\pi},$$

$$S_2(\theta, r, y) = (1 - S_4(y)) \times \frac{1}{\sigma\sqrt{2\pi}} e^{\frac{-(r\sin\theta)^2}{2\sigma^2}} \times \int_{-r\cos(\theta)}^{C_2 - r\cos(\theta)} \frac{1}{\sigma\sqrt{2\pi}} e^{\frac{-x^2}{2\sigma^2}} dx,$$

$$S_3(y) = \left(\frac{sgn(\min(V(x) \to V(y)) - C_3) + 1}{2}\right) \times \left(\frac{sgn(C_4 - \max(V(x) \to V(y))) + 1}{2}\right),$$

where sgn represents the Signum function, $$sgn(x) = \begin{cases} -1 & \text{if } x < 0 \\ 0 & \text{if } x = 0, \\ 1 & \text{if } x > 0 \end{cases}$$

$$S_4(y) = \max_{x^\perp} \left[\left(\frac{sgn(\min(V(x^\perp) \to V(y)) - C_3) + 1}{2}\right) \times \left(\frac{sgn(\max(V(x^\perp) \to V(y)) - C_4) + 1}{2}\right)\right],$$

and $$S_5(\theta, r, y) = (s_4(y)) \times \frac{1}{\sigma\sqrt{2\pi}} e^{\frac{-(r\sin(\theta))^2}{2\sigma^2}} \times \int_{-r\cos(\theta-180)}^{C_2 - r\cos(\theta-180)} \frac{1}{\sigma\sqrt{2\pi}} e^{\frac{-x^2}{2\sigma^2}} dx.$$

Portions of this formulation are similar to the previous one. Again, $V(x)$ refers to the value within the image volume at location $x$. $C_1$, $C_2$, and $\sigma$ are constants that depend on the properties of the acquisition device 105 and objects of interest. $C_1$ is derived from the Hounsfield values for air or soft tissue for CT data, while the values for $C_2$ and $\sigma$ are size related and depend on the object of interest. In addition, the value of the function $T$ is constant and set to one. The additional constants $C_3$ and $C_4$ are derived from the Hounsfield values of air and tagged stool regions, respectively.

The function $S_1$ still provides a scaling only for the magnitude of the gradient. $S_3$ provides a scaling based on the gray-level values along the path from $x$ to $y$, but also accounts for tagged stool. $S_4$ produces a maximum output based on the 3D path starting at $y$ and heading opposite the path $V(x) \to V(y)$. $S_4$ decides which of the two scoring functions $S_3$ or $S_5$ to use by functioning as a tagged stool detector.

The value provided by the function $S_4$ is between 0 and 1. Given any path that crosses tagged stool, the function $S_4$ becomes 0. Constraints on the values over which $x^{-1}$ is searched can be imposed for faster evaluation. $S_4$ can also be used as a count and locator for voxel contributions near tagged stool. This information can then be used for segmentation and classification as will be described hereinafter with reference to steps 225-235.

The functions $S_3$ and $S_5$ also score the location for a normal colon region and regions with or near tagged stool, respectively. These functions assign a raw score to the point under consideration based upon the angle and radius, e.g., the distance from x to y. Again, the value of $S_4$ decides which score is taken. If $S_4$ takes on fractional values, this will allow both scores to be averaged together based on the fractional value.

In the modified MARS filter, M(x) is less separable than in the conventional MARS filter due to the dependence of the $S_2$ and $S_5$ functions on y. However, this dependence is necessary to allow the appropriate function to be applied by the function $S_4$. Thus, although computation time may increase as compared to the conventional MARS filter, a very fast implementation can be accomplished with look-up tables and numerical approximation techniques.

Now that the modified MARS filter has been applied, regions of high response that exceed a certain threshold are taken as polyp candidates (220b). In other words, locations in the response image that are above the threshold are selected as polyp candidates. For example, given a threshold T, if a location x within the image has a filter output that is greater than T, then it is considered a candidate.

Depending on the $S_4$ response, it can be determined which contributing voxels are near tagged stool. For example, since $S_4$ takes on a value of 0 or 1, the value can be used in a binary decision to classify the location y as either near tagged stool (e.g., 1) or not (e.g., 0). Thus, the modified MARS filter not only generates candidates as in a standard colon CAD method, but also estimates a percentage of tagged stool potentially covering the candidate by taking points of high contribution with, e.g., $S_4=1$, divided against all points of high contribution to the integral.

Since the modified MARS filter does not rely on an explicit surface definition, a precise colon segmentation is not required, as previously mentioned. However, the use of a rough segmentation or localization as described with reference to step 215 can dramatically increase processing speed since it limits the regions of the image where computation occurs. For example, in step 215, the approximate segmentation first captures the air-filled regions and then dilates the results to cover potential candidates. However, by modifying this approach, any polyps that are covered by stool can also be included in a subsequent segmentation.

For example, after the dilation, certain regions of the colon touch tagged stool. These regions can be identified by analyzing their Hounsfield values. By further dilating these regions to ensure that they encompass voxels with Hounsfield values near the colon wall, the result is a custom dilated region that encompasses all potential polyp candidates. Thus, by performing this additional dilation, potential polyp candidates that may be covered or partially covered by stool can be identified. In this segmentation (225), the precise location of the colon wall is not necessary.

The response image used to generate polyp candidates could also be used for the polyp segmentation of step 225 in collaboration with the modified MARS filter. An example of using a response image for polyp segmentation in conjunction with a candidate generator is described in U.S. Patent Application Publication No. 20050020912, entitled, "Method and system for response image feature collection and candidate summit, surface, and core estimation", a copy of which is incorporated by reference herein in its entirety. Here, voxels that contribute to the response image are used to segment the polyp candidates.

By using the technique described in U.S. Patent Application Publication No. 20050020912, stool can also be subtracted from the colon by taking highly contributing voxels with a value of 1 in the $S_4$ equation as belonging to locations near tagged stool. A partial volume model of the colon wall and tagged stool can then be applied to differentiate the two regions and subtract the stool. Assuming that the candidate generator has a very high sensitivity for detecting true polyps, this process can better define the colon wall around all potential candidates.

Other methods of stool subtraction can also be applied to noncandidate regions. These methods need not be perfect if the goal is only polyp detection. Thus, since similar calculations are performed, an efficient system that performs colon CAD and local stool removal around the polyp at the same time can be realized.

The goal of an exemplary embodiment of the present invention is to detect polyps in the presence of tagged stool. Assuming a 100% detection rate for the candidate generator, locations without candidates are unlikely to contain polyps. Therefore, these regions can undergo a different type of processing than the locations with candidates. The difference can be an alternative or more time consuming processing method applied only to locations near the candidates.

After the polyp candidate segmentation, features are collected from each candidate, both at the center of detection and in the region defined by the candidate segmentation (230). Features are generally based on the combination of the original image data as well as a possible polyp segmentation. Functions of these inputs are used to create a variety of values (e.g., features) pertaining to the candidate.

Since the candidate generator can detect tagged stool and hence candidates defined near such locations, the tagged stool may introduce artifacts that may modify feature values. Thus, when collecting candidate features, candidates near stool can be specified to have different features computed or they can be marked to undergo another type of classification.

The polyp candidates are then classified according to the collected features (235). Once the features are collected, the classification can make use of any classification method such as those described, e.g., in A K Jerebko, J D Malley, M Franaszek, and R M Summers, "Computer aided polyp detection in CT colonography using an ensemble of support vector machines", 5th International Workshop on Computer-Aided Diagnosis, June 2003, and Kiraly A P, Yaks S, Macari M, Geiger B, Bogoni L, Novak C L, "A fast method for colon polyp detection in high-resolution CT data", CARS 2004: 983-988.

Two different classification methods can be used for polyp candidates that are obtained near versus far from tagged stool regions. These classifiers can be specialized to deal with features obtained from polyps without tagged stool.

The classifier may also be used to better delineate borders for local stool removal near polyp candidates by allowing for the application of different subtraction methods. For example, a local stool removal method can proceed in a variety of ways depending on the classifier and candidate generator results.

In accordance with an exemplary embodiment of the present invention, a CAD method for polyp detection in tagged or non-tagged stool images makes no use of global stool subtraction and operates on the tagged or non-tagged images directly to produce and classify polyp candidates in a tagged or non-tagged stool dataset. Direct application to the images allows for more robustness and speed. The method uses a modified MARS filter that can replace existing candidate generators that do not involve explicit surface generation. The method further includes a candidate segmentation scheme along with a classification method for use in conjunction with the modified MARS filter. The method may also be applied to CAD methods that include stool subtraction. Unlike, existing trends in research on colon CAD for tagged stool, which focus on modifying the image data itself, the method for polyp detection modifies the CAD algorithm instead.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for detecting polyp candidates in a medical image, comprising:
applying a filter to an image of a colon to generate a response image; and
identifying polyp candidates in tagged stool and clean sections of the colon in the response image,
wherein the image of the colon is acquired from a medical imaging device,
wherein the filter is represented by the following formula:

$$M(x) = \frac{\int_{V,y \in V'} S(m, \theta, r, y) \Delta y}{T(V')}, \text{ where}$$

$$S(m, \theta, r, y) = S_1(m) \times S_3(y) \times (S_2(\theta, r, y) + S_5(\theta, r, y),$$

where $M(x)$ is an output of the filter at a location x within the image of the colon, y is another location in the image of the colon, m is a magnitude of a gradient at y, r is a radial distance from y to x, $\theta$ is an angle between the gradient at y and a ray from x to y, V' is a volume of the image of the colon and T is a weighting based on a size of the volume,
wherein the method is performed using a processor.

2. The method of claim 1, further comprising:
localizing the colon before applying the filter.

3. The method of claim 1, further comprising:
collecting features of the polyp candidates.

4. The method of claim 3, further comprising:
segmenting the polyp candidates before collecting features of the polyp candidates.

5. The method of claim 3, wherein collecting features of the polyp candidates comprises:
collecting features of polyp candidates in the clean sections of the colon; and
collecting features of polyp candidates covered or partially covered with the tagged stool.

6. The method of claim 3, further comprising:
classifying the polyp candidates according to the collected features.

7. The method of claim 6, wherein classifying the polyp candidates comprises:
classifying the polyp candidates covered or partially covered with the tagged stool; and
classifying the polyp candidates in the clean sections of the colon.

8. The method of claim 1, further comprising:
marking the polyp candidates in the response image with identifiers indicating a further processing to be performed thereon.

9. The method of claim 1, wherein $$S_1(m) = \frac{\left(\tan^{-1}(m - C_1) + \frac{\pi}{2}\right)}{\pi},$$

$$S_2(\theta, r, y) = (1 - S_4(y)) \times \frac{1}{\sigma\sqrt{2\pi}} e^{\frac{-(r \times \sin\theta)^2}{2\sigma^2}} \times \int_{-r \times \cos(\theta)}^{C_2 - r \times \cos(\theta)} \frac{1}{\sigma\sqrt{2\pi}} e^{\frac{-x^2}{2\sigma^2}} dx,$$

$$S_3(y) = \left(\frac{sgn \ (\min(V(x) \to V(y)) - C_3) + 1}{2}\right) \times \left(\frac{sgn \ (C_4 - \max(V(x) \to V(y))) + 1}{2}\right)$$

$$\text{and } S_5(\theta, r, y) = (s_4(y)) \times \frac{1}{\sigma\sqrt{2\pi}} e^{\frac{-(r \times \sin(\theta))^2}{2\sigma^2}} \times \int_{-r \times \cos(\theta - 180)}^{C_2 - r \times \cos(\theta - 180)} \frac{1}{\sigma\sqrt{2\pi}} e^{\frac{-x^2}{2\sigma^2}} dx.$$

10. The method of claim 9, wherein $$S_4(y) = \max_{x^\perp}\left[\left(\frac{sgn\ (\min(V(x^\perp) \to V(y)) - C_3) + 1}{2}\right) \times \left(\frac{sgn\ (\max(V(x^\perp) \to V(y)) - C_4) + 1}{2}\right)\right]$$

and $sgn(x) = \begin{cases} -1 & \text{if } x < 0 \\ 0 & \text{if } x = 0 \\ 1 & \text{if } x > 0 \end{cases}$.

11. A computer program product comprising a non-transitory computer useable medium having computer program logic recorded thereon for detecting polyp candidates in a medical image, the computer program logic comprising:
  program code for applying a filter to an image of a colon to generate a response image; and
  program code for identifying polyp candidates in tagged stool and clean sections of the colon in the response image,
  wherein the filter is represented by the following formula:

$$M(x) = \frac{\int_{\forall y \in V'} S(m, \theta, r, y) \Delta y}{T(V')}, \text{ where}$$

$S(m, \theta, r, y) = S_1(m) \times S_3(y) \times (S_2(\theta, r, y) + S_5(\theta, r, y))$, where M(x) is an output of the filter at a location x within the image of the colon, y is another location in the image of the colon, m is a magnitude of a gradient at y, r is a radial distance from y to x, θ is an angle between the gradient at y and a ray from x to y, V' is a volume of the image of the colon and T is a weighting based on a size of the volume.

12. The computer program product of claim 11, further comprising:
  program code for localizing the colon before applying the file

13. The computer program product of claim 11, further comprising:
  program code for collecting features of the polyp candidates.

14. The computer program product of claim 13, further comprising:
  program code for segmenting the polyp candidates before collecting features of the polyp candidates.

15. The computer program product of claim 13, wherein the program code for collecting features of the polyp candidates comprises:
  program code for collecting features of polyp candidates in the clean sections of the colon; and
  program code for collecting features of polyp candidates covered or partially covered with the tagged stool.

16. The computer program product of claim 13, further comprising:
  program code for classifying the polyp candidates according to the collected features.

17. The computer program product of claim 16, wherein the program code for classifying the polyp candidates comprises:
  program code for classifying the polyp candidates covered or partially covered with the tagged stool; and
  program code for classifying the polyp candidates in the clean sections of he colon.

18. The computer program product of claim 11, further comprising:
  program code for marking the polyp candidates in the response image with identifiers indicating a further processing to be performed thereon.

19. A system for detecting polyps in a medical image, comprising:
  a memory device for storing a program; and
  a processor in communication with the memory device, the processor operative with the program to:
  apply a filter to an image of a colon to generate a response image; and
  identify polyp candidates in tagged stool and clean sections of the colon in the response image,
  wherein the filter is represented by the following formula:

$$M(x) = \frac{\int_{\forall y \in V'} S(m, \theta, r, y) \Delta y}{T(V')}, \text{ where}$$

$S(m, \theta, r, y) = S_1(m) \times S_3(y) \times (S_2(\theta, r, y) + S_5(\theta, r, y))$, where M(x) is an output of the filter at a location x within the image of the colon, y is another location in the image of the colon, m is a magnitude of a gradient at y, r is a radial distance from y to x, θ is an angle between the gradient at y and a ray from x to y, V' is a volume of the image of the colon and T is a weighting based on a size of the volume.

20. The system of claim 19, wherein the image of the colon is acquired by a computed tomography. magnetic resonance or ultrasound device.

\* \* \* \* \*